US 7,788,246 B2

(12) United States Patent
Ivanov et al.

(10) Patent No.: US 7,788,246 B2
(45) Date of Patent: Aug. 31, 2010

(54) LINGUISTIC STRUCTURE FOR DATA FLOW DIAGRAMS

(75) Inventors: Sergei Ivanov, Issaquah, WA (US); J. Kirk Haselden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1129 days.

(21) Appl. No.: 11/354,452

(22) Filed: Feb. 15, 2006

(65) Prior Publication Data

US 2007/0192083 A1   Aug. 16, 2007

(51) Int. Cl.
  *G06F 7/00* (2006.01)
(52) U.S. Cl. .................. 707/705; 707/756; 707/755
(58) Field of Classification Search .................. None
  See application file for complete search history.

(56) References Cited

U.S. PATENT DOCUMENTS

| | | | | |
|---|---|---|---|---|
| 5,021,947 | A * | 6/1991 | Campbell et al. | 712/25 |
| 5,390,320 | A * | 2/1995 | Smithline | 703/20 |
| 6,437,805 | B1 | 8/2002 | Sojoodi et al. | |
| 6,493,869 | B1 | 12/2002 | Kwiatkowski et al. | |
| 2004/0088691 | A1 | 5/2004 | Hammes et al. | |
| 2004/0186915 | A1 | 9/2004 | Blaszczak et al. | |
| 2004/0243982 | A1 | 12/2004 | Robison | |
| 2004/0264367 | A1 | 12/2004 | Edwards | |
| 2005/0183007 | A1 | 8/2005 | Gaug et al. | |
| 2005/0209840 | A1 | 9/2005 | Baklashov et al. | |
| 2005/0257194 | A1 | 11/2005 | Morrow et al. | |

OTHER PUBLICATIONS

Namballa, et al.; Control and Data Flow Graph Extraction for High-Level Synthesis; 2004; 6 pages.
Keceli, et al.; First Version of a Dataflow Interchange Format; 2002; 17 pages.
Marceau, et al.; A Dataflow Language for Scriptable Debugging; 10 pages.
Preiss, et al.; Data Flow on a Queue Machine; 1985; 11 pages.

* cited by examiner

*Primary Examiner*—Charles Rones
*Assistant Examiner*—Belix M Ortiz
(74) *Attorney, Agent, or Firm*—Workman Nydegger

(57) ABSTRACT

A linguistic system and method of representing a data flow diagram is provided. Given the capabilities of a conventional data flow graph, and given the types of nodes that can exist in the graph, the subject innovation employs a specific method to create a language capable of describing the data flow graph. The resulting language can be used in application program interfaces (APIs), user interfaces (UIs) and the like to allow users to quickly enter definitions of data flow graphs as they are using various software systems, such as spreadsheet applications, word processing applications, presentation applications, business systems, etc. The language can identify complex data flows that include multiple sources, chained transformation components and/or multiple destinations.

20 Claims, 9 Drawing Sheets

LINGUISTIC STRUCTURE FOR DATA FLOW DIAGRAMS

BACKGROUND

The data flow diagram began being widely used as a primary tool for structured data analysis in the 1970's. Data flow diagrams, also known as data flow graphs, are a common way to represent data integration processes. In other words, these diagrams can be employed to document the logical flow of data through a set of computer-implemented processes or procedures. As such, the diagram can include external sources and destinations of the data, activities that transform the data and stores or collections where the data is held. Although primarily used by developers, data flow diagrams are very easy to understand by even non-technical users.

In accordance therewith, the nodes in the graph represent the sources, transformations and destinations of data. As well, the movement, or flow, of data units between the nodes is illustrated by connecting appropriate nodes on the diagram. The data flow diagram is oftentimes used as a communication tool for analysts to model processes and functional requirements.

Today, the diagrams are still considered one of the best modeling techniques for representing the processing requirements of a computer-implemented system. To this end, data flow diagrams have broad application and usability across most software development projects. Moreover, the data flow diagram can be integrated with workflow modeling tools, data modeling, and textual specifications. However, this is often expensive and inconvenient to the actual data flow process.

In accordance with modeling systems today, a user graphically builds a data flow diagram by employing a graphical editor. As such, shapes would be chosen, graphically drawn and connected as desired in order to represent a desired data flow. Under the covers, there can be an object model, which is a set of programmability interfaces, by which it can be possible to programmatically represent the graph. In other words, once a user creates a data flow diagram, conventional systems can employ an object model to generate a declarative representation of the graphical representation. However, these conventional systems are expensive and inconvenient in that they require both the graphical editor as well as a modeling application in order for a user to effectively represent a desired data flow.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a linguistic method of representing a data flow diagram. Given the capabilities of a conventional data flow graph, and given the types of nodes that can exist in the graph, the subject innovation employs a specific method to create a language capable of describing the data flow graph. The resulting language can be used in application program interfaces (APIs), user interfaces (UIs) and the like to allow users to quickly enter definitions of data flow graphs as they are using various software systems, such as spreadsheet applications, word processing applications, presentation applications, business systems, etc.

One novel feature of the innovation is the generation of a language suitable for describing an arbitrary data flow graph. In accordance with a particular aspect of the innovation, a user can commence the process of linguistically representing a data flow by defining a data flow statement, named "select", for example. In this example, "select", can be used to define a path of data that flows from a data flow component. Next, a user can define column specifications. For the purposes of graph construction, column specification controls output columns available downstream of the source component. A "from" clause can follow that contains an identifier of the connection sourcing the data or containing another "select" expression defining the upstream component. Further, a "where" clause may follow to define filters on the data. This "where" clause translates to a conditional split component on the data flow path.

For each further component that may exist in the data flow, a language clause is allocated that directs a language parser to insert the component in the data flow. There can be an interface that allows the component to participate in inserting itself in the data flow and implementing customized parsing of the clause parameters. For example, a sort component might expose an "order by" clause and implement parsing of the "order by" clause parameters to appropriately configure itself for sorting the column(s) identified by the user.

In another aspect of the subject innovation, a data flow simulation system and method for interpreting a data flow linguistic structure is provided. For example, the system can include a parser that evaluates the structure thereby effectuating processes upon data in accordance with the structure. As well, the parser can determine a source location, or set of source locations, for which to access the data. Similarly, the parser can determine a destination location and/or set of destination locations for which to deliver data. Although specific syntax is described herein, it will be understood and appreciated that any syntax and/or naming convention can be employed in accordance with alternative aspects without departing from the novel linguistic representations and interpretations described herein.

In still another aspect, the data flow simulation system can include a dynamic grammar component that can identify available adapters and/or components. For example, a dynamic grammar component can be employed to identify user modified/developed transformation components which can be employed within a data flow linguistic structure.

In yet another aspect thereof, an artificial intelligence (AI) component is provided that employs a probabilistic and/or statistical-based analysis to prognose or infer an action that a user desires to be automatically performed. For example, an AI component can be employed to infer a user preference and/or to make suggestions with respect to a UI.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will

DETAILED DESCRIPTION

Figure 1:
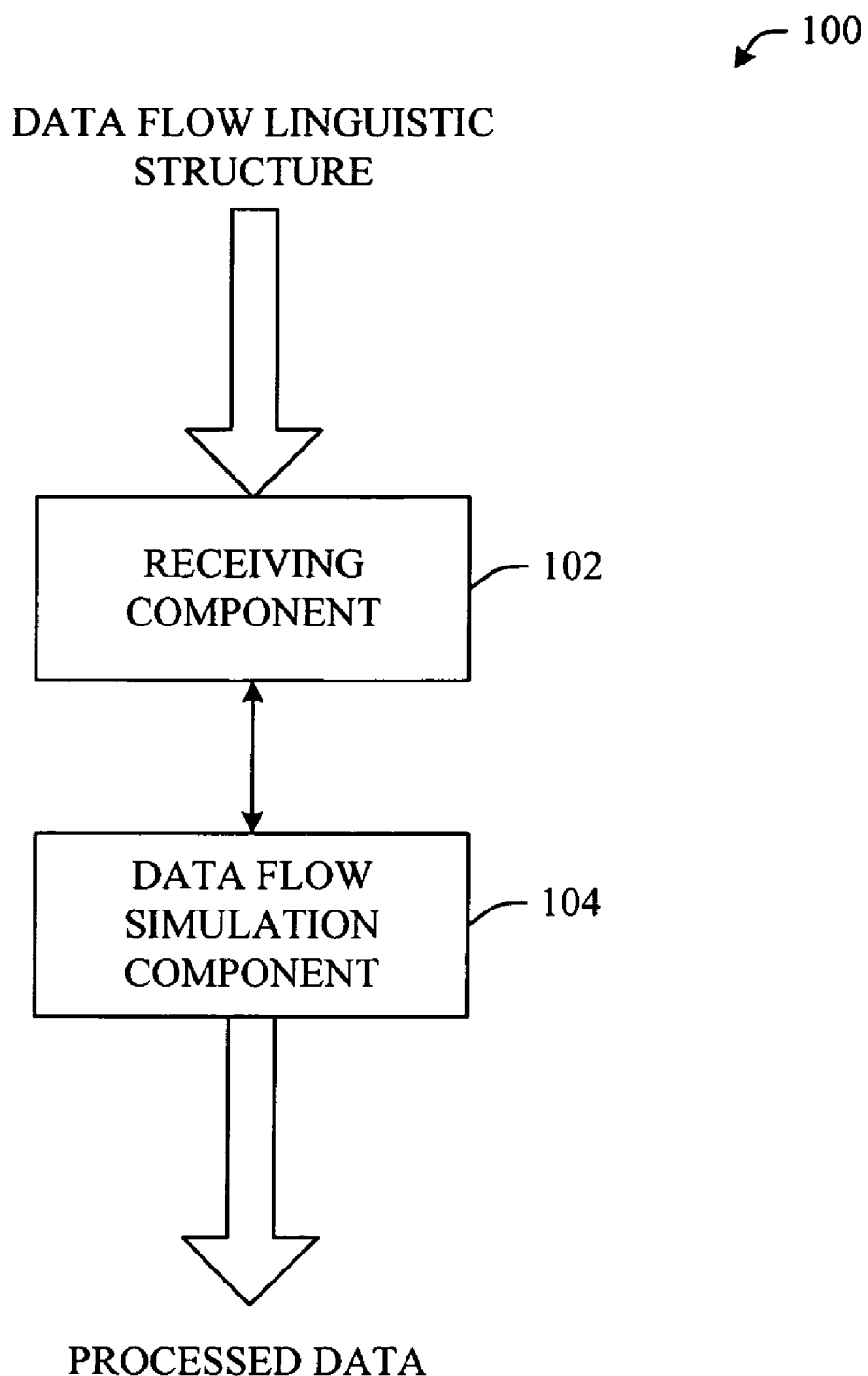
FIG. 1 illustrates a system that facilitates interpreting a data flow linguistic structure in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates processing a data flow linguistic structure in accordance with an aspect of the innovation. Generally, system 100 can include a receiving component 102 and a data flow simulation component 104 each of which contribute to processing data as set forth in accordance with the linguistic structure. Although specific aspects and scenarios are described herein, it is to be understood and appreciated that these scenarios are provided to add perspective to the innovation and are not intended to limit the innovation in any manner. In other words, it is to be understood and appreciated that other aspects exist and are to be included within the scope of this specification and claims appended hereto.

The systems and methods described herein can be particularly useful in connection with processes involving extraction, transformation and loading of data. For example, in a scenario where data is obtained from a number of disparate sources, transformed and imported into a target application(s) (e.g., spreadsheet), the subject system can facilitate representing the data flow, complex or otherwise, in a linguistic manner as a data flow linguistic structure. This data flow linguistic structure can be input into the receiving component 102 and thereafter processed by the data flow simulation component 104.

As will be understood upon a review of the figures that follow, the data flow simulation component 104 can dynamically discover available adapters, components and modules thereby modifying the data in accordance with the linguistic structure. For example, the subject system 100 enables users to employ preexisting transformation components when processing data. As well, the system 100 can enable a user to develop, revise, load and access remote transformation components which can be employed by the data flow simulation component 104 to process data. By way of example, the system can enable independent software vendors (ISVs) to develop transformation components that can later be discovered and used by the data flow simulation component 104 in processing the data.

It is to be understood that when a user creates a data transformation package or structure, that package can define what operations will be performed on the data. As such, this information can be expressed as a data flow graph. In accordance with the system 100, data can be read from different kinds of sources and/or systems. The data can be brought into memory in tabular format, processed and written out to a destination. Sources available are dependent upon what source adapters are available. Similarly, destinations available are dependent on what kind of destination adapters are available.

As described supra, adapters sometimes ship with a software package—as well, ISV's and other developers can also build their own custom adapters. Conventionally, in order to impose an effect or transformation on data once it is in memory, a user would connect the source with the destination through a set of transformation components. In other words, the user would literally draw a set of sources and determine the types of data by a set of columns. Thereafter, a data flow path would be connected to a transformation component that performs some predefined function based upon the nature of the component.

By way of example, a simple transformation can be expressed as a conversion to uppercase or an execution of a currency conversion. Other examples can perform complex mathematical operations upon multiple columns of data. By way of further example, a product system can multiply a unit cost by the number of units sold to determine a total cash flow for a product.

In operation, transformation components can be chained together to accept an input which is an output of another component. Conventionally, this operation would be performed graphically in contrast to the linguistic manner of the novel subject innovation. It will be appreciated that a source adapter can be viewed as a transformation component that does not have an input but actually generates data.

In accordance with traditional systems, once all of the components are graphically connected, a data flow graph is established. Although the aforementioned example is directed to a very simple case having a single source, several transformations and a destination, it will be understood that data flow systems are oftentimes very complex including many sources, transformations components and destination components. For example, the data flow can include a fork or split component in that a single data flow can be input into a transformation component whereby an arbitrary number of legs can be generated and processed separately and potentially differently. As will be understood, these split components can greatly enhance the complexity of a data flow system. The split components are oftentimes employed when one file is consumed and inserted into tables on multiple different servers. One particularly novel feature of the subject system 100 is to enable representation of this data flow in a linguistic manner rather than the conventional graphical method which oftentimes requires specialized graphical software applications.

As described above, conventionally, a user would graphically build a data flow diagram by employing a graphical editor. As such, shapes would be chosen, graphically drawn and connected as desired in order to represent a desired data flow. Under the covers, there can be an object model, which represents a set of programmability interfaces, by which it can be possible to programmatically create the graph. These interfaces operate based upon the object model in order to generate a declarative representation of the graphical representation. To the contrary, the subject innovation enables any data flow to be directly represented in a linguistic manner. Thus, graphics editors and/or conversion programs are not necessary components in order to instruct a specific data transformation and/or data flow.

Figure 2:
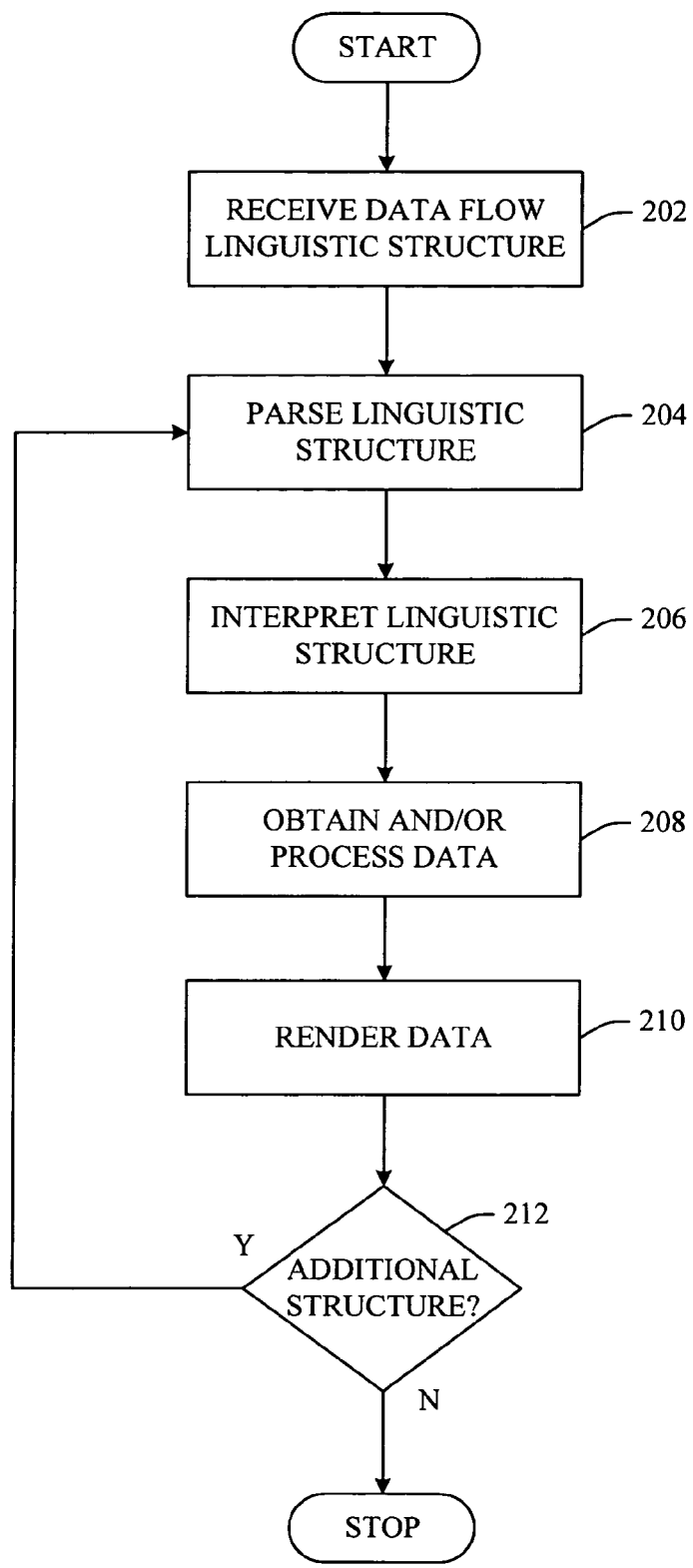
FIG. 2 illustrates an exemplary flow chart of procedures that facilitate interpreting a data flow linguistic structure in accordance with an aspect of the innovation.

FIG. 2 illustrates a methodology of processing data in accordance with an aspect of the novel linguistic representation of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, a data flow linguistic structure can be received. As will be understood following a review of the figures that follow, a user can generate the data flow linguistic structure thus employing a language to describe a particular desired data flow. The structure can be parsed at 204 in order to analyze the grammatical content of the structure. Once parsed, the parsed segments of the linguistic structure can be interpreted at 206.

After the linguistic structure segment is interpreted, the data can be obtained and/or processed at 208 in accordance with the interpretation. For example, data can be accessed from a number of sources as defined in the structure. As well, data can be transformed in accordance with the interpretation. Once processed, the data can be rendered at 210.

At 210, the data can be rendered to a subsequent component in accordance with the defined data flow or to an application or other target destination including, but not limited to, utility applications, databases, tables, etc. as desired. At 212, a determination is made if additional structure exists within the data flow linguistic structure. If so, linguistic structure is parsed at 204 and the methodology progresses as described supra. If no additional structure is present, a stop block is reached.

Figure 3:
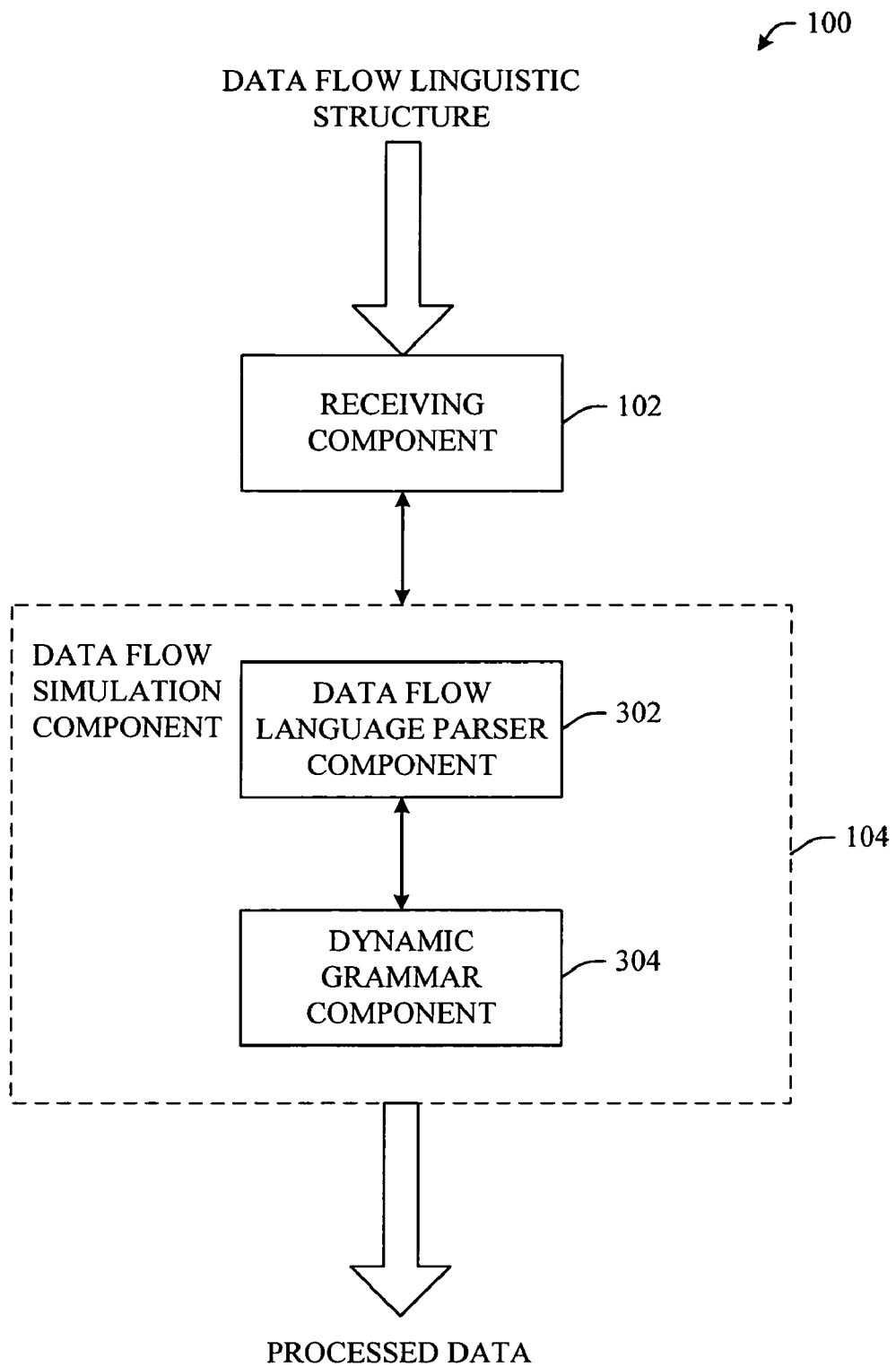
FIG. 3 illustrates an alternative system that employs a parser and a dynamic grammar component to simulate a data flow in accordance with an aspect of the innovation.

Referring now to FIG. 3, an alternative aspect of system 100 in accordance with the innovation is shown. More particularly, the system 100 illustrated in FIG. 3 includes a data flow simulation component 104 having a data flow language parser component 302 and a dynamic grammar component 304 therein. Although the data flow language parser component 302 and the dynamic grammar component 304 are shown as distinct components within the data flow simulation component 104, it is to be understood that the functionality, or any subset thereof, of each component can be included within the other component or within one common component.

As described supra, the subject innovation can provide for a system that enables writers and users of applications to linguistically embed data transformation functionality in the way that they consume data. For example, with reference to a spreadsheet application, a user can instruct access of a database, import of a table and insertion of transformed (or untransformed) data into the spreadsheet. As such, the host application can access the information and make it available for the user to perform any desired action upon the data.

It is a novel feature of the subject innovation to enable data access, transformation and delivery to occur inline. In other words, as a user application (e.g., business application) is being employed, users can specify how data should be transformed. Continuing with the aforementioned example, suppose a user desires to import data into a spreadsheet, the subject innovation can enable a user not only to import the data, but, the user can also specify how they would like the data in a particular table, or group of tables, transformed prior to importing the data. In other words, the transformations upon the data can occur "on-the-fly." This instruction can be provided via the data flow linguistic structure and interpreted via the data flow simulation component 104.

In operation, the data flow language parser component 302 can evaluate the data flow linguistic structure and can hereafter interact with the dynamic grammar component 304 to access, transform and render the data as desired. The dynamic grammar component 304 can dynamically make adapters available for use with respect to the data flow linguistic structure. Each of these components will be described in greater detail infra with respect to more specific exemplary syntactical examples. While specific syntax is referenced in the examples that follow, it is to be understood that any syntax can be employed in connection with the novel functionality of the innovation.

It is to be appreciated that conventional systems require creating a separate graphical package and using a separate product to read, transform and store the data and subsequently using the business application to access the stored, transformed data. In contrast therewith, the subject system 100 exposes a mechanism that enables a user to directly define (and interpret) the transformations in a linguistic manner. In comparing this to traditional query languages (e.g., SQL-brand mechanisms), the conventional query languages can enable a user can define a query that will obtain data from a single database. In other words, the user can write a query that defines what parts of the data are desired for the system to return—however, this conventional query mechanism can only be accomplished with very limited functionality with respect to applying operators (e.g., applying expressions to a column) upon the data.

In contrast, the subject system 100 can enable a user to define a data flow linguistic structure which is a complete data flow-based process for transforming data. Where conventional systems required procedural construction of a data flow via a separate graphical application (e.g., construction of a data flow graph), the subject innovation provides a declarative manner in which a user can directly define the data flow via a syntactical language.

Figure 4:
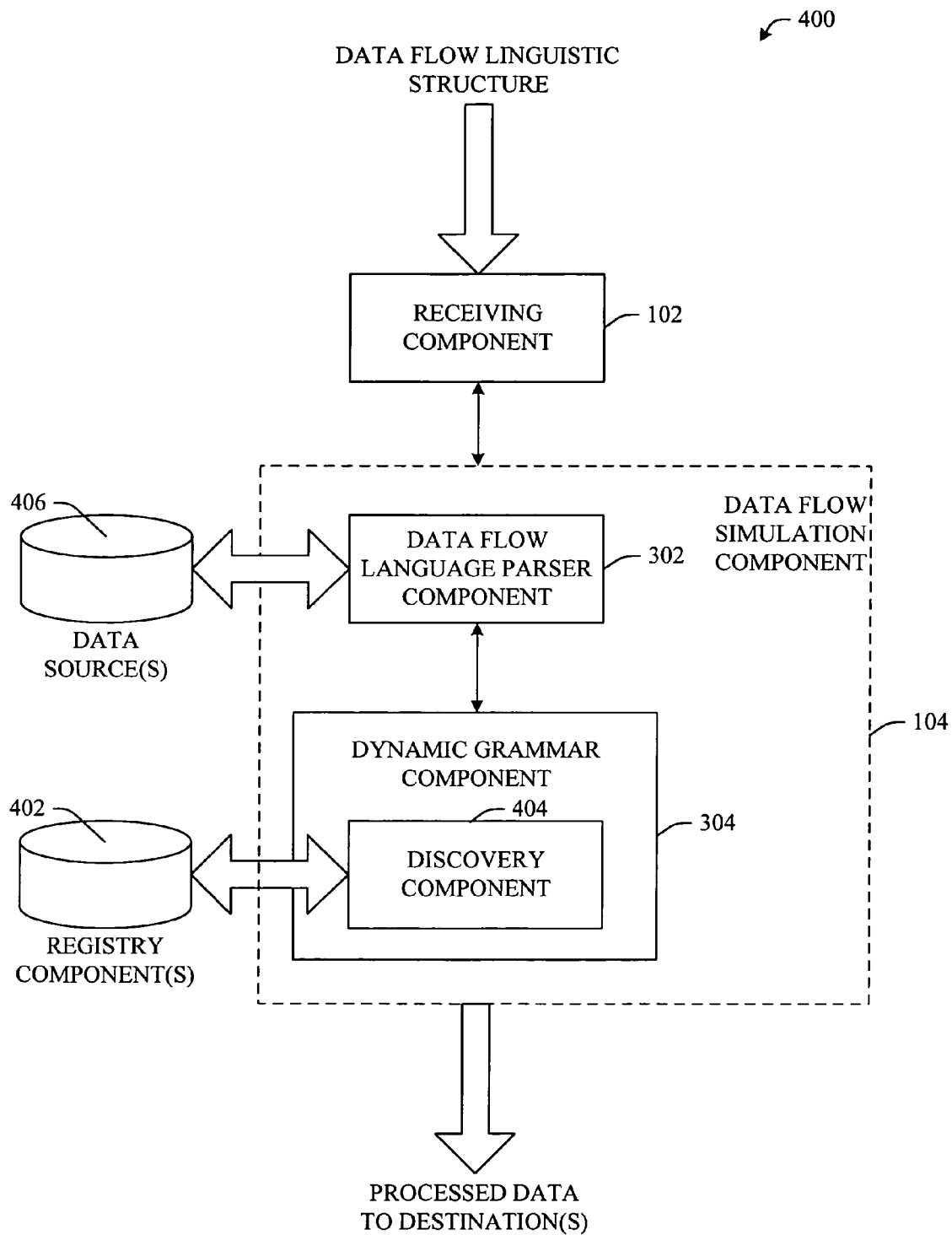
FIG. 4 illustrates an exemplary block diagram of a system that employs a discovery component that can discover available adapters and components with respect to a data flow linguistic structure.

Referring now to FIG. 4, an alternative system 400 that facilitates interpretation of a data flow linguistic structure in accordance with an aspect of the innovation is shown. More particularly, the system 400 can include a registry component 402 that can monitor adapters (e.g., source, transformation and destination) available to the grammar component. In operation, the dynamic grammar component 304, via a discovery component 404, can interrogate a registry component 402 (or group of registry components (not shown)) in order to identify available adapters.

As described above, one novel feature of the subject innovation is that the innovation can dynamically employ newly created and/or modified adapters rather than only pre-defined and pre-loaded adapters. In other words, a user or ISV can create adapters which can be tracked in the registry component 402 and dynamically located via the discovery component 404. Thereafter, these newly discovered adapters can be employed to implement a data flow linguistic structure.

Moreover, as shown in FIG. 4, in accordance with the novel data flow linguistic structure, the system 400 is capable of obtaining data from any number of data sources 406. As such, the data flow language parser component 302 can determine (via the dynamic grammar component 304) that data is to be accessed from multiple data sources 406. Similarly, the novel system 400 is capable of rendering data to multiple destinations as shown in FIG. 4. It is to be appreciated that the registry component(s) 402 as well as the data source(s) 406 can be local or remote from the other components shown in FIG. 4 without departing from the spirit and/or scope of the innovation.

Continuing with the conventional SQL-based comparison, there are some similarities of what a user can perform in SQL-based environments as what can be performed in simple data flows. However, SQL-based operations are only performed by the database server within the database itself. In accordance with the subject innovation, the novel syntactical data flow-based mechanism is much more flexible in that it can process within the host application (e.g., spreadsheet) that is executing the data flow.

Additionally, as described above, the novel data flow system 400 can read data from different places whereas, database-specific systems (e.g., SQL-based systems) can only operate upon data that is stored in it. More particularly, the novel data-flow system described herein can actually pull data from different locations (e.g., data sources 406) and work with the data on the client, for example, where the data-flow is being employed within a particular host application.

Continuing with distinctions between the subject innovation and conventional systems, SQL-based systems employ a defined language with a limited (e.g., finite) set of capabilities. This narrowly limited language is based upon and defined by an established specification. To the contrary, the novel linguistic data-flow system 100 described herein, is an extensible and completely user-defined system. In other words, the transformation components referenced and employed by the system described herein can be developed as desired (e.g., by users, by ISVs), dynamically discovered and employed "on-the-fly."

By way of example, the user-defined transformation components can define how many inputs are to be accepted, how many outputs will be generated as well as what transformations will be performed upon the data (e.g., columns). For example, a transformation component can define receiving 5 inputs (e.g., data sources 406) and generating 2 outputs to destinations. In another example, a transformation component can define receiving 3 inputs and generating 7 outputs. As will be appreciated, the combinations of inputs to outputs can be defined as desired. As such, the examples described herein are included for illustrative purposes and are not intended to limit the novelty of the innovation in any way.

Figure 5:
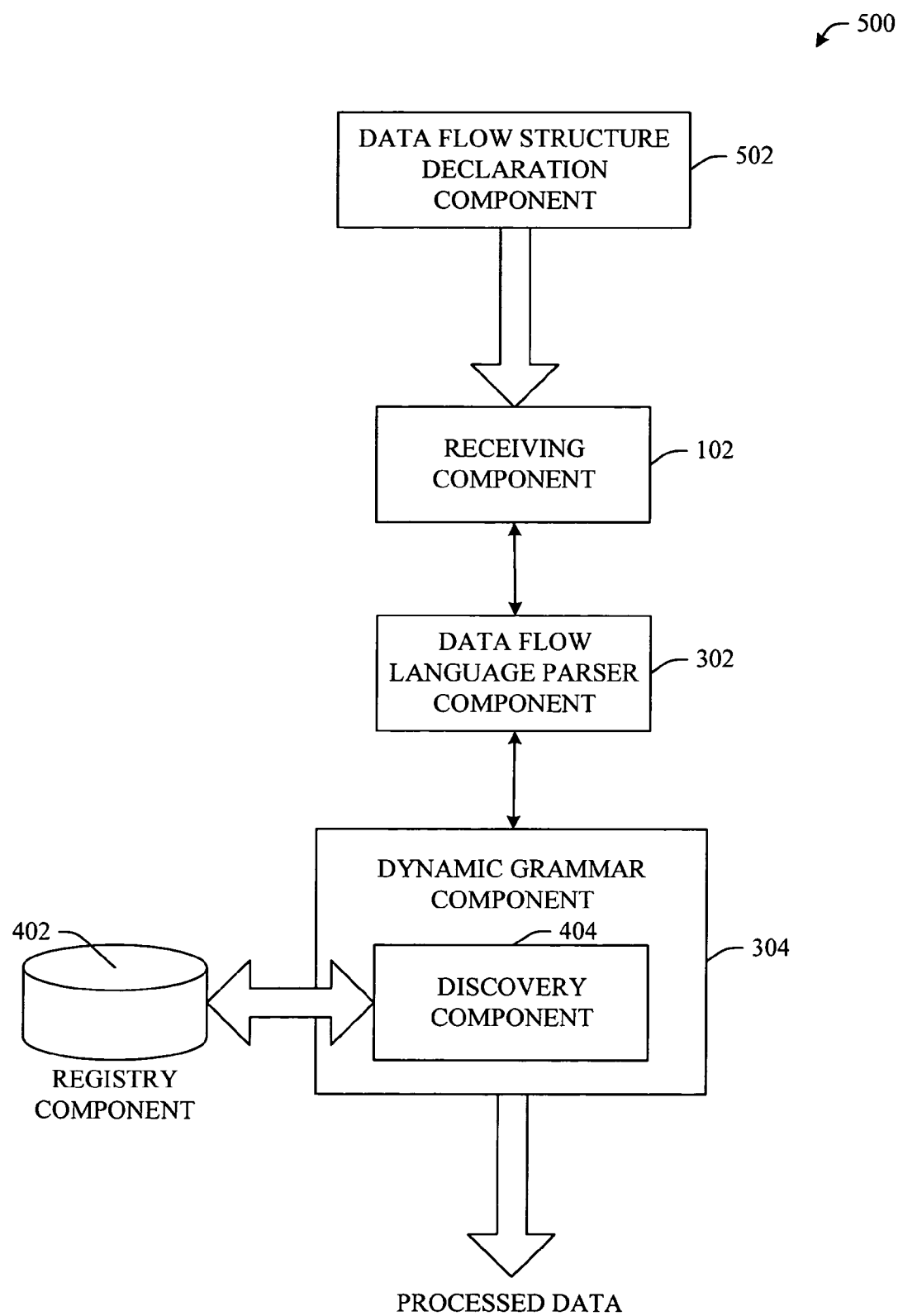
FIG. 5 illustrates a system that includes a data flow structure declaration component that enables a user to linguistically represent a data flow in accordance with an aspect of the innovation.

FIG. 5 illustrates another alternative system 500 that facilitates generating and interpreting a data flow linguistic structure in accordance with an aspect of the innovation. More particularly, the system can include a data flow structure declaration component 502 that enables generation of a data flow linguistic structure. As described above, the other novel components illustrated in FIG. 5 can be employed to interpret the structure and manipulate data in accordance therewith.

In operation, the data flow structure declaration component 502 can facilitate definition of a translation language (e.g., data flow linguistic structure) based upon the general structure of a data flow (e.g., inputs and outputs) and the fact that there can be any arbitrary number of transformable components. Given a set of components, the system 500 can have an entity which, for example data flow language parser 302 and/or discovery component 404, can discover a list of available components on a system. Accordingly, in one aspect, the data flow language parser component 302 can ask each of the available components to define an operand (e.g., symbol that can be used in a linguistic structure). It will be appreciated that these components and operands can be system and/or user defined.

In one example, a source that reads data from a database can use a "select" operation as its operand. Therefore, with respect to this source, the system 500 can define a set of output columns as well as location(s) from which the data will be read. By way of more particular example, the innovation can enable data transformations in data applications that provide for data access. It will be appreciated that many conventional applications that provide for data access can employ SQL-based operations therefore, the subject novel innovation can be compatible with the existing SQL-based systems within these data access applications.

However, rather than running access to a database as SQL-based systems, the subject innovation can run a data flow graph which, as described above, is more flexible, extensible and powerful than conventional applications. It is to be appreciated that the syntax used in accordance with the examples disclosed herein is provided merely to add perspective to the innovation. To this end, the syntax described and referenced herein is not intended to limit the scope of the innovation in any way.

By way of further example, and not limitation, a source within the language can be created by a "create call" and having further calls to insert output columns. As well, source connection information and information to connect the source to the destination component can be provided via calls. In operation, for interpretation, the system can employ the data flow language parser component 302 and the dynamic grammar component 304. The dynamic grammar component 304 can go out when the language module (e.g., data flow structure declaration component 502) is initialized and determine what kinds of components are available on the system. In one aspect, this determination can be made by interrogating one or more registry components 402.

Figure 6:
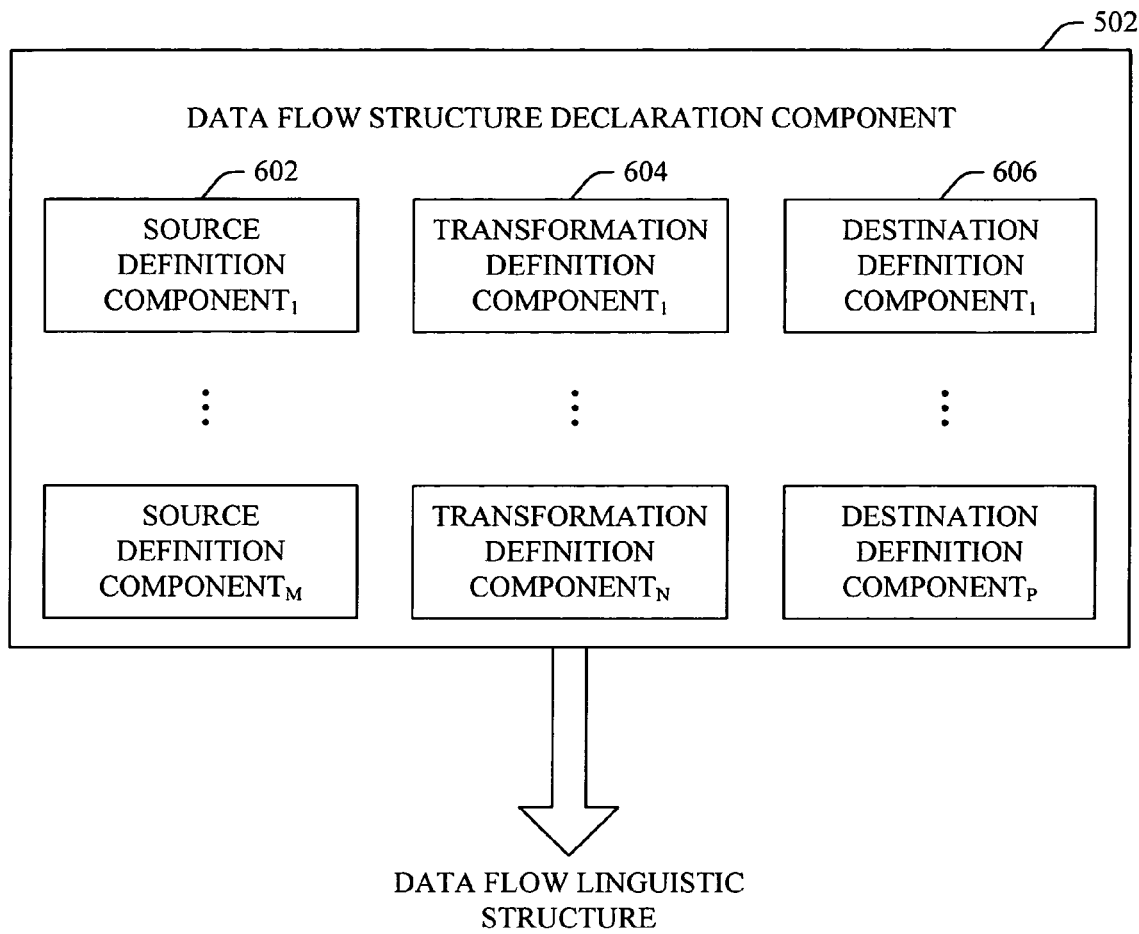
FIG. 6 illustrates an exemplary architecture of a data flow structure declaration component in accordance with an aspect of the innovation.

With reference to FIG. 6, a block diagram of a data flow structure declaration component 502 is shown in accordance with an aspect of the innovation. More particularly, the data flow structure declaration component 502 can include 1 to M source definition components 602, 1 to N transformation definition components 604, and 1 to P destination definition components 606, where M, N and P are integers. Effectively, the block diagram illustrated in FIG. 6 is provided to illustrate that the data flow structure can include linguistic segments that refer to multiple source, transformation and destination components.

For simplicity, consider a system that has a source component and a destination component—to define the source component, the source component can be interrogated by the dynamic grammar component (e.g., 304 of FIG. 3) and can determine that the statement (e.g., operand) is "select." Therefore, when "select" is employed by a source definition component 602 in the language source code for a query, this word can prompt the data flow language parser (e.g., 302 of FIG. 3) which source component to employ.

Continuing with the example, one exemplary syntactical format that can be employed can include the component name (e.g., "select") followed by a set of output columns, for example, "select, stock symbol, current price, change" which defines the output for the component. Next, a user can specify the connection information that will be fed into this component. It will be understood that any information that flows after the "from" is transparent to the data flow language parser because this command is fed directly to the component. Therefore, the system can enable a user to employ any syntax to describe the source of the data.

For example, in SQL-based systems a user can merely instruct selection of a set of columns from a single table—as such, there is no way to get the data from anywhere else since this "table" is what the language specifies. In accordance with the subject innovation, a user can employ a command such as "select ff, set of output columns, from string" where "ff" signifies "from file" and the string specifies a filename.

In accordance with the novel innovation, components can be chained together such that multiple actions can be performed upon selected data. For example, suppose a user has a single statement, accordingly, a source can be defined by a "select" statement—"select, output columns from parameter." When this expression is evaluated, the result is an output. Therefore, when the system parses the "select" statement, it does not execute it directly but rather translates it internally into the data flow graph.

Accordingly, the system parses the source of the data flow query, figuratively builds the data flow graph and executes the data flow graph. It will be appreciated that the system does not execute the statement directly. Rather, when the system parses the structure, the statement instructs the system how to create the state component (e.g., source) as well as the output columns associated therewith. As such, the user can parameterize the source component with the parameters that follow the "from"—therefore, the system is aware of the output.

In accordance with the chaining functionality, the user can instruct the system to "insert into." In this example, it is to be understood that "insert into" can represent a designation for a destination component just as "select" is a designation for a "source component." In one example, the system can be instructed to "insert into" a "database table." Considering an example directed to a stock database, the following command can be employed "'Insert into' stocklist 'select' stocks, price, change 'from' stock.txt."

As will be understood, the source (e.g., stock.txt) appears at the end of the expression. In particular, this exemplary statement defines the destination (e.g., stocklist) first then the source for the destination (e.g., stock.txt). It will be appreciated that this linguistic structure is consistent with an interpretation of a data flow diagram whereas data flow diagrams are most often read from the destination forward.

By way of a source, transformation, destination example, consider a currency conversion system, in this system a user can create a source component, a component that performs a conversion and a destination component. Linguistically, a command can be structured to "'insert into' stocklist 'convert' price*conversion ratio, change*conversion ratio 'select' symbol, price, change 'from' stocks.txt." Here, "convert" is representative of the currency transformation component. In other words, "convert" is the operand that represents the transformation component. It is to be understood that since this transformation component only operates within the data flow, a "from" clause is not necessary as the data is not retrieved from an external source.

It is to be understood that the innovation employs the data flow paradigm which is most often directed to data processing. One key aspect of the innovation is that the innovation represents a dynamic language that enables a user to add, delete and/or modify components as they are released and/or made available. In accordance therewith, the system can employ a registry and a registration file that dynamically records available components with respect to the system. As components are loaded, the system can ask for information with regard to each component. For example, the system can ask for the components "operand" or "alias." This operand can be used in the declaration of the data flow structure. As well the system can determine the set of inputs and outputs upon discovery.

Another very significant distinction between the subject innovation and conventional SQL-based systems is that the subject innovation can employ multiple inputs and outputs whereas the conventional systems are limited to a single input and a single output. In other words, in accordance with conventional systems, the transformations are very linear such that the system can only take a single input, transform it, and write it to a single destination output. In other words, conventional systems are not capable of splitting and/or merging data flow paths. To the contrary, the subject innovation can facilitate linguistic representation of complex data flow graphs. The language of the subject innovation can support both direct as well as complex graphs.

Referring again to the stock example above, the subject innovation can facilitate writing to two (or more) destination files (e.g., stocks with a price change and stocks without a price change). In accordance with conventional systems, it would be necessary to access the source file multiple times in order to establish these multiple outputs.

Contrary to conventional systems where all data is contained within a database table, it is to be understood that the subject data flow representation system can be employed with any source data such as tables, streaming data, etc. In other words, in some situations, the system can employ data that is merely streamed and not stored thus it can be particularly useful to enable multiple transformations and/or outputs from a single source. In another example, the data can be located at a remote location where it would be inefficient to access the data multiple times. In this example, the subject innovation can generate multiple outputs from a single data source. All in all, the novel linguistic data flow structure of the subject innovation can facilitate obtaining data from multiple sources, splitting outputs to multiple destinations and dynamically employing transformation components available.

Figure 7:
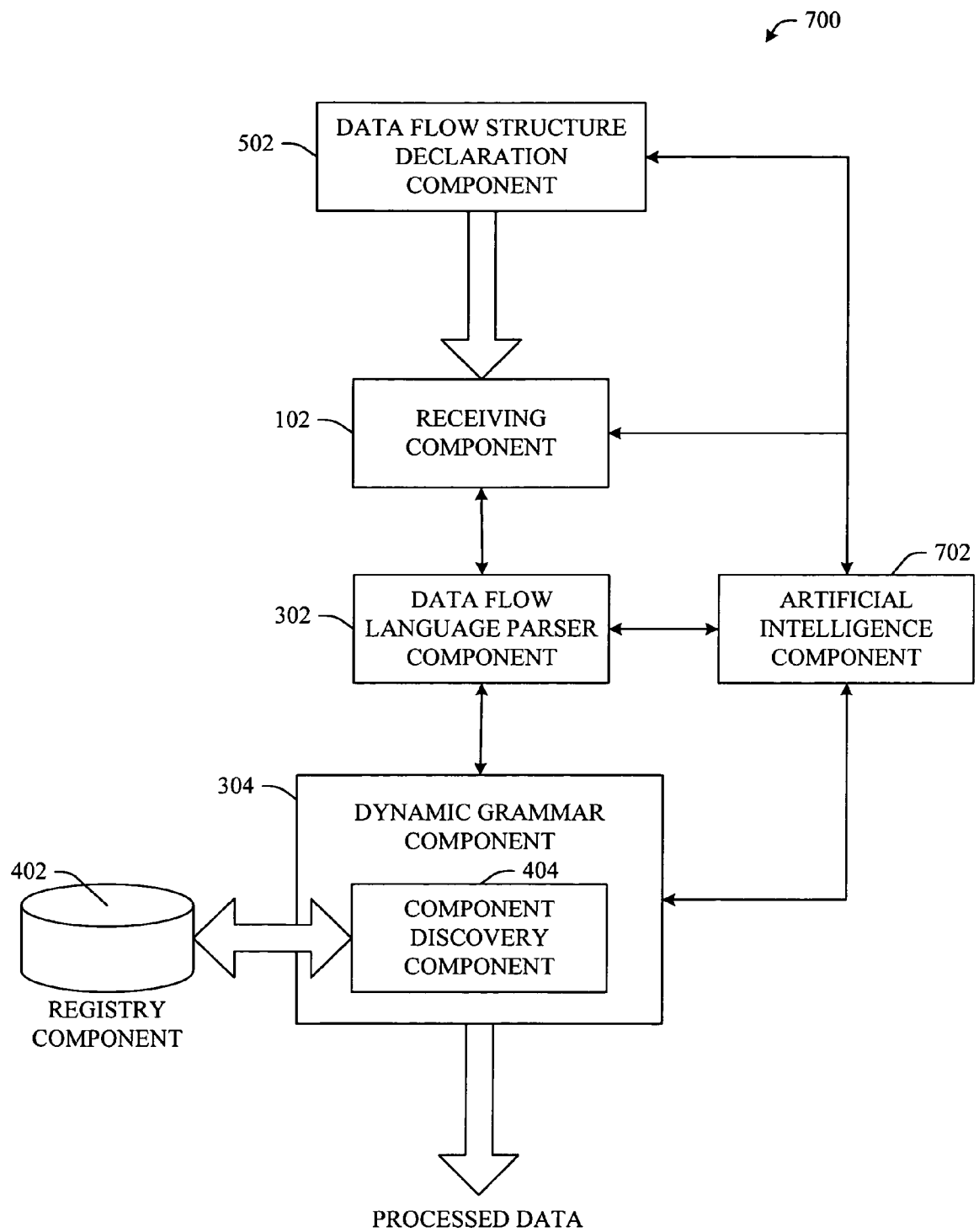
FIG. 7 illustrates an architecture including an artificial intelligence-based component that can automate functionality in accordance with an aspect of the novel innovation.

In yet another aspect, a user interface (e.g., wizard) can be employed to assist in generating the linguistic structure. In accordance therewith, FIG. 7 illustrates a system 700 that employs an artificial intelligence (AI) component 702 which facilitates automating one or more features in accordance with the subject innovation. For example, the subject innovation (e.g., in connection with determining data sources and/or destinations) can employ various AI-based schemes for carrying out various aspects thereof. For example, a process for determining where to access information, which transformations to employ, where to write information, etc. can be facilitated via an automatic classifier system and process. Moreover, the system can employ drop down menus that infer and/or suggest source locations, transformation components and/or destination locations.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes can be categories or areas of interest, etc.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria were to access information/data, what transformations to perform on the data and where/how to render the data to a destination or group of destinations.

Figure 8:
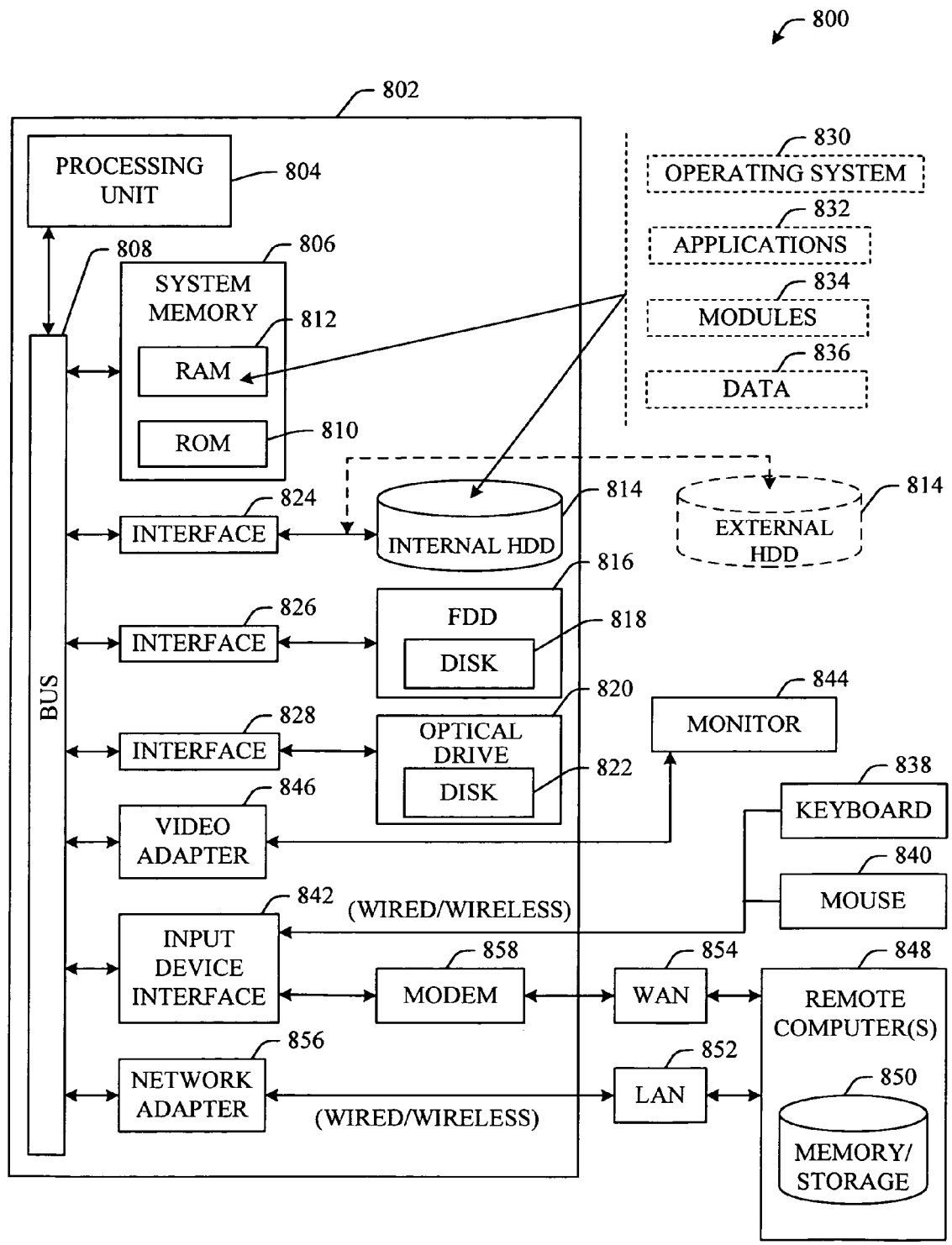
FIG. 8 illustrates a block diagram of a computer operable to execute the disclosed architecture.

Referring now to FIG. 8, there is illustrated a block diagram of a computer operable to execute the disclosed architecture of generating and/or interpreting a data flow linguistic structure. In order to provide additional context for various aspects of the subject innovation, FIG. 8 and the following discussion are intended to provide a brief, general description of a suitable computing environment 800 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the innovation includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the innovation can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5

GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
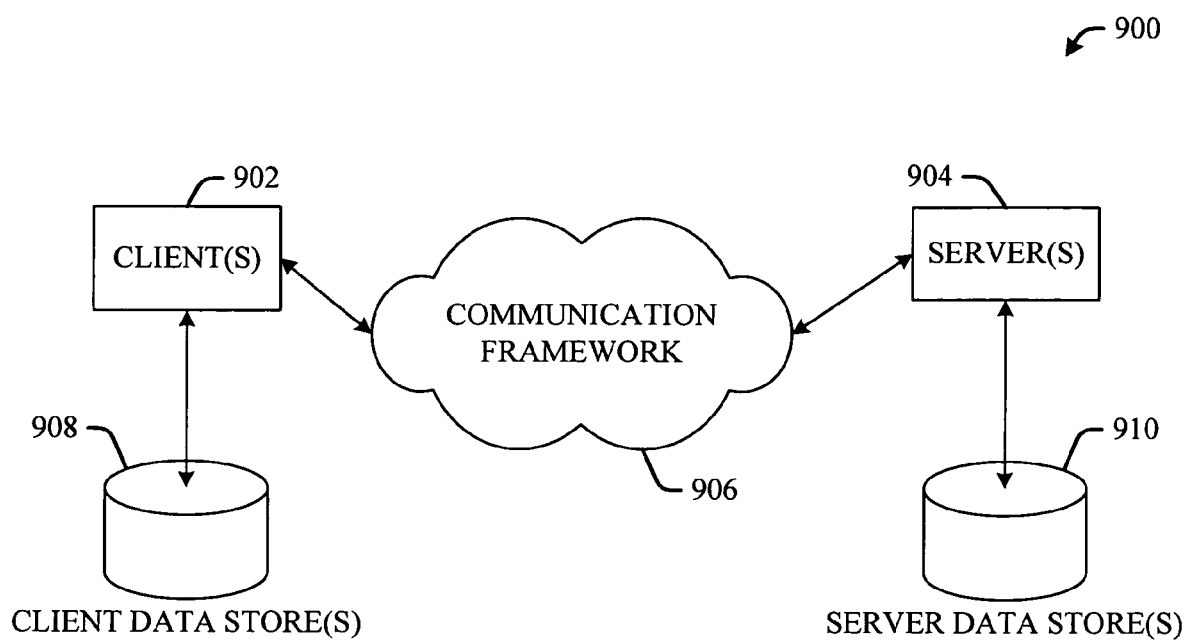
FIG. 9 illustrates a schematic block diagram of an exemplary computing environment in accordance with the subject innovation.

Referring now to FIG. 9, there is illustrated a schematic block diagram of an exemplary computing environment 900 in accordance with the subject innovation. The system 900 includes one or more client(s) 902. The client(s) 902 can be hardware and/or software (e.g., threads, processes, computing devices). The client(s) 902 can house cookie(s) and/or associated contextual information by employing the innovation, for example.

The system 900 also includes one or more server(s) 904. The server(s) 904 can also be hardware and/or software (e.g., threads, processes, computing devices). The servers 904 can house threads to perform transformations by employing the innovation, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates representing a data flow in a linguistic, non-graphical manner, the system comprising:
    a spreadsheet program embodied on a computer readable-storage medium, the spreadsheet program including a plurality of computer-executable components including:
        a receiving component that directly receives a linguistic, non-graphical, representation of a data flow structure, wherein the linguistic, non-graphical, representation of the data flow structure was not previously derived from any graphical representation of a data flow and wherein the linguistic, non-graphical, representation of the data flow structure includes a plurality of actions chained together in which outputs of one or more of the actions are bound as inputs to one or more of the other actions; and
        a data flow simulation processor that processes data in accordance with the plurality of chained-together actions of the linguistic, non-graphical, representation of the data flow structure by evaluating the linguistic, non-graphical, representation of the data flow structure.

2. The system of claim 1, wherein the data flow processor comprises a data flow language parser component that determines at least one of a source, transformation and destination adapter identified within the data flow structure.

3. The system of claim 2, wherein the data flow processor further comprises a dynamic grammar component that informs the data flow language parser component of a plurality of available adapters.

4. The system of claim 3, wherein the dynamic grammar component includes a discovery component that locates the plurality of available adapters and reports to the data flow language parser.

5. The system of claim 4, wherein the discovery component accesses a registry component to locate the plurality of available adapters.

6. The system of claim 1, further comprising a data flow structure declaration component that facilitates generation of the data flow structure represented in a linguistic manner.

7. The system of claim 6, wherein the data flow structure definition component comprises a plurality of source definition components.

8. The system of claim 6, wherein the data flow structure definition component comprises a plurality of transformation definition components.

9. The system of claim 6, wherein the data flow structure definition component comprises a plurality of destination definition components.

10. The system of claim 1, further comprising an artificial intelligence (AI) component that infers an action that a user desires to be automatically performed.

11. A method of representing a data flow in a linguistic, non-graphical manner, comprising:
    receiving a linguistic, non-graphical, representation of a data flow structure, wherein the linguistic, non-graphical data, representation of the data flow structure was not previously derived from any graphical representation of a data flow and wherein the linguistic, non-graphical, representation of the data flow structure includes a plurality of actions chained together in which outputs of one or more of the actions are bound as inputs to one or more of the other actions;
    parsing the linguistic, non-graphical, representation of the data flow structure;
    interpreting the plurality of chained-together actions included in the linguistic, non-graphical, representation of the data flow structure; and
    processing data based at least in part upon the interpretation of the plurality of chained-together actions included the linguistic, non-graphical data flow structure;
    wherein the method is performed by a data flow processor of a spreadsheet program embodied on a computer readable-storage medium of a computer.

12. The computer-implemented method of claim 11, further comprising obtaining the data from a plurality of sources.

13. The computer-implemented method of claim 11, further comprising rendering the data.

14. The computer-implemented method of claim 13, wherein the act of rendering comprises transferring the data to a plurality of destinations.

15. The computer-implemented method of claim 11, further comprising generating the data flow linguistic structure.

16. The computer-implemented method of claim 11, further comprising discovering at least one of a plurality of source, transformation and destination components.

17. The computer-implemented method of claim 11, further comprising developing a transformation adapter and making the transformation adapter available to the data flow linguistic structure.

18. A computer program product for use at a computer system, the computer program product for implementing a method of representing a data flow in a linguistic, non-graphical manner, the computer program product comprising:
one or more computer storage medium having stored thereon computer-executable instructions that, when executed by a processor, cause a data flow processor of a spreadsheet program of the computer system to perform the method, including the following:
receive a linguistic, non-graphical, representation of a data flow structure, wherein the linguistic, non-graphical, representation of the data flow structure is directly received and was not previously derived from any graphical representation of a data flow and wherein the linguistic, non-graphical, representation of the data flow includes a plurality of actions chained together in which outputs of one or more of the actions are bound as inputs to one or more of the other actions;
parse the linguistic, non-graphical, representation of the data flow structure;
interpret the plurality of chained-together actions included in the linguistic, non-graphical, representation of the data flow structure; and
process data based at least in part upon the plurality of chained-together actions included in of the linguistic, non-graphical, representation of the data flow structure.

19. The computer-readable storage medium of claim 18, wherein the method further comprises obtaining the data from a plurality of sources.

20. The computer-readable storage medium of claim 18, wherein the method further comprises transferring the data to a plurality of destinations.

* * * * *